United States Patent
Lindee et al.

(10) Patent No.: US 9,888,696 B2
(45) Date of Patent: *Feb. 13, 2018

(54) AUTOMATED PRODUCT PROFILING APPARATUS AND PRODUCT SLICING SYSTEM USING THE SAME

(71) Applicant: FORMAX, INC., Mokena, IL (US)

(72) Inventors: Scott A. Lindee, Mokena, IL (US); Thomas C. Wolcott, Mokena, IL (US); Salvatore Lamartino, Orland Park, IL (US); Gage Fox, Mokena, IL (US)

(73) Assignee: FORMAX, INC., Mokena, IL (US)

( * ) Notice: Subject to any disclaimer, the term of this patent is extended or adjusted under 35 U.S.C. 154(b) by 257 days.

This patent is subject to a terminal disclaimer.

(21) Appl. No.: 14/963,791

(22) Filed: Dec. 9, 2015

(65) Prior Publication Data

US 2016/0088852 A1    Mar. 31, 2016

Related U.S. Application Data

(63) Continuation of application No. 13/504,008, filed as application No. PCT/US2010/054152 on Oct. 26, 2010, now Pat. No. 9,285,213.

(Continued)

(51) Int. Cl.
   *H04N 9/47*       (2006.01)
   *H04N 7/18*       (2006.01)
   (Continued)

(52) U.S. Cl.
   CPC ...... *A22C 17/0086* (2013.01); *A22C 17/0033* (2013.01); *G01B 11/2545* (2013.01);
   (Continued)

(58) Field of Classification Search
   CPC .. A22C 17/0086; A22C 17/0033; H04N 7/18; H04N 5/247; G06T 7/0004; G06T 2207/30128; G01G 13/00; G01B 11/2545
   (Continued)

(56) References Cited

U.S. PATENT DOCUMENTS

3,527,083 A    9/1970    Hensgen
3,730,742 A    5/1973    Burton et al.
(Continued)

FOREIGN PATENT DOCUMENTS

CA    2070822 A       12/1990
DE    37 14199 C2     11/1987
(Continued)

OTHER PUBLICATIONS

U.S. Appl. No. 14/114,492, filed Sep. 19, 1978, Skidmore.
(Continued)

*Primary Examiner* — Jared Walker
(74) *Attorney, Agent, or Firm* — Klintworth & Rozenblat IP LLP

(57) ABSTRACT

An apparatus for acquiring a profile of a food product for use in subsequent processing of the food product includes a scanning area and one or more product drives for driving a product through the scanning area in a longitudinal direction. First line lasers project one first transverse laser line transversely to the longitudinal direction on the first surface and two first cameras arranged to capture different, overlapping first transverse image portions of the first transverse laser line. A reference laser projects a beam on the first surface that indicates a transverse reference position, and the two first cameras also capture the reference position. A control system uses the transverse reference position to combine the different first transverse image portions captured by the two first cameras to calculate a first profile of (Continued)

the first surface at multiple positions along a length of the first surface as the product is driven through the scanning area.

30 Claims, 14 Drawing Sheets

Related U.S. Application Data

(60) Provisional application No. 61/255,458, filed on Oct. 27, 2009.

(51) Int. Cl.
*A22C 17/00* (2006.01)
*G01B 11/25* (2006.01)
*G01G 13/00* (2006.01)
*G06T 7/00* (2017.01)
*H04N 5/247* (2006.01)

(52) U.S. Cl.
CPC ........... *G01G 13/00* (2013.01); *G06T 7/0004* (2013.01); *H04N 5/247* (2013.01); *H04N 7/18* (2013.01); *G06T 2207/30128* (2013.01)

(58) Field of Classification Search
USPC ......................................................... 348/89
See application file for complete search history.

(56) References Cited

U.S. PATENT DOCUMENTS

| | | |
|---|---|---|
| 3,751,873 A | 8/1973 | Toby |
| 4,038,531 A | 7/1977 | Loe, Jr. |
| 4,136,504 A | 1/1979 | Wyslotsky |
| 4,158,507 A | 6/1979 | Himmel |
| 4,188,544 A | 2/1980 | Chasson |
| 4,208,933 A | 6/1980 | Skidmore |
| 4,264,208 A | 4/1981 | Haberl et al. |
| 4,279,513 A | 7/1981 | Tucker |
| 4,324,335 A | 4/1982 | Conway et al. |
| 4,428,263 A | 1/1984 | Lindee et al. |
| 4,532,840 A | 8/1985 | Antonissen |
| 4,534,288 A | 8/1985 | Brovman |
| 4,541,722 A | 9/1985 | Jenks |
| 4,557,019 A | 12/1985 | Van Devanter et al. |
| 4,572,044 A | 2/1986 | Antonissen |
| 4,580,475 A | 4/1986 | Antonissen |
| 4,624,367 A | 11/1986 | Shafer et al. |
| 4,855,608 A | 8/1989 | Peterson, II |
| 4,905,512 A | 3/1990 | Hayashi |
| 4,959,553 A | 9/1990 | Yamada et al. |
| 4,962,568 A | 10/1990 | Rudy et al. |
| 5,028,799 A | 7/1991 | Chen |
| RE33,851 E | 3/1992 | Rudy et al. |
| RE33,904 E | 4/1992 | Rudy et al. |
| 5,117,717 A | 6/1992 | Mally |
| 5,136,906 A | 8/1992 | Antonissen et al. |
| 5,163,865 A | 11/1992 | Smith |
| 5,184,733 A | 2/1993 | Amarson et al. |
| 5,226,241 A | 7/1993 | Goodwin |
| 5,324,228 A | 6/1994 | Vogeley et al. |
| 5,372,540 A | 12/1994 | Burch et al. |
| 5,450,333 A | 9/1995 | Minami et al. |
| 5,481,466 A | 1/1996 | Carey |
| 5,526,119 A | 6/1996 | Blit et al. |
| 5,628,237 A | 5/1997 | Lindee et al. |
| 5,745,237 A | 4/1998 | Yahiro et al. |
| 5,774,220 A | 6/1998 | Wienecke |
| 5,902,177 A | 5/1999 | Tessier et al. |
| 5,937,080 A | 8/1999 | Vogeley, Jr. et al. |
| 5,960,104 A | 9/1999 | Conners et al. |
| 5,974,925 A | 11/1999 | Lindee et al. |
| 6,137,577 A | 10/2000 | Woodworth |
| 6,164,174 A | 12/2000 | Sigurdsson et al. |
| 6,177,999 B1 | 1/2001 | Wurz et al. |
| 6,272,437 B1 | 8/2001 | Woods et al. |
| 6,407,818 B1 | 6/2002 | Whitehouse |
| 6,882,434 B1 | 4/2005 | Sandberg et al. |
| 7,153,203 B2 | 12/2006 | Pfarr et al. |
| 7,373,217 B2 | 5/2008 | Young |
| 7,450,247 B2 | 11/2008 | Sandberg et al. |
| 7,623,249 B2 | 11/2009 | Sandberg et al. |
| 7,651,388 B2 | 1/2010 | Faires et al. |
| 2006/0156878 A1 | 7/2006 | Faires et al. |
| 2008/0164316 A1 | 7/2008 | Patel et al. |
| 2009/0064833 A1 | 3/2009 | Sandberg et al. |
| 2009/0151527 A1 | 6/2009 | Lindee et al. |
| 2009/0323082 A1 | 12/2009 | Patko et al. |

FOREIGN PATENT DOCUMENTS

| | | |
|---|---|---|
| DE | 3805455 | 8/1989 |
| DE | 4001298 A1 | 7/1991 |
| DE | 4037383 A1 | 5/1992 |
| DE | 4301538 A1 | 7/1994 |
| DE | 19604254 A1 | 8/1997 |
| DE | 8706145.7 | 2/1998 |
| DE | 19741730 A1 | 4/1999 |
| EP | 0500478 | 2/1992 |
| EP | 0227701 B1 | 3/1992 |
| EP | 1044770 A1 | 10/2000 |
| EP | 1046478 A1 | 12/2000 |
| EP | 1 630 519 A1 | 3/2006 |
| FR | 2 627 423 A1 | 8/1989 |
| GB | 991972 | 5/1965 |
| GB | 1507683 | 4/1978 |
| GB | 2099609 | 12/1982 |
| GB | 2 149 650 | 6/1985 |
| GB | 264602 A | 9/1993 |
| JP | 1-132333 | 5/1989 |
| JP | 7-184534 | 7/1995 |
| JP | 09029693 A | 2/1997 |
| JP | 11230728 A | 8/1999 |
| WO | 88/03645 | 5/1988 |
| WO | 89/08983 | 10/1989 |
| WO | 91/08439 A1 | 6/1991 |
| WO | 93/22114 A1 | 11/1993 |
| WO | 93/24287 | 12/1993 |
| WO | 95/21375 | 1/1995 |
| WO | 98/35797 | 8/1998 |
| WO | 98/42196 | 10/1998 |
| WO | 99/06796 A1 | 2/1999 |
| WO | 99/47885 | 9/1999 |
| WO | 00/61338 | 10/2000 |

OTHER PUBLICATIONS

Thurne, "IBS 2000 Visions Slicer," 2 pages.
Dynamic Control Systems, "L4 3D Snapshot Scanner," The Next Generation of 3-D Snapshot Scanning, 4 pages.
Lumetch, "Automatic Trimming Machine for Fish Fillets," 6 pages.
DSI Stein, "The Portioner," Automated Waterjet Cutting and Portioning System, 6 pages.
Townsend, "Townsend Integrated Bacon Network," 6 pages.
3D-Digitalisierung von FreiformWichen mit Laser, Edgar Budzynski and Rudolf M. Aretz, VDI-Z Nr. 7, Jul. 1990, 4 pages.
Notification of Transmittal of International Search Report for International Patent Application No. PCT/US2010/054152 dated Jun. 10, 2011, 6 pages.
Partial Supplementary European Search Report for European Patent Application No. 10 827 401.0-1568 dated Nov. 6, 2017, 12 pages.

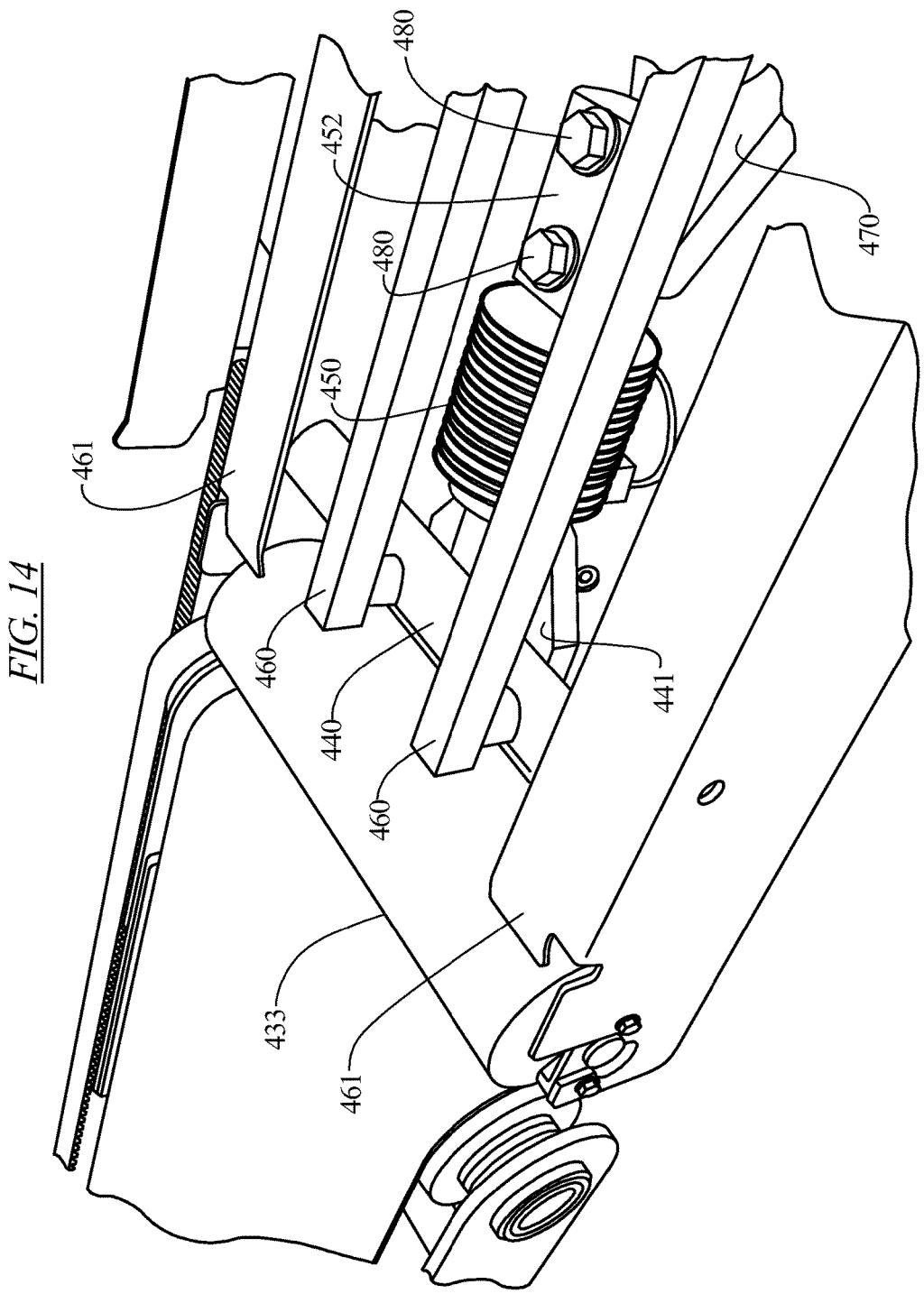

AUTOMATED PRODUCT PROFILING APPARATUS AND PRODUCT SLICING SYSTEM USING THE SAME

RELATED APPLICATIONS

The present application is a continuation of co-pending U.S. patent application Ser. No. 13/504,008, filed Apr. 25, 2012, which is 371 nationalization application of PCT application no. PCT/US2010/054152, filed Oct. 26, 2010, which claims the benefit of U.S. Provisional Patent Application No. 61/255,458, filed Oct. 27, 2009, all of which are incorporated by reference herein in their entirety.

FIELD OF THE INVENTION

The present invention relates to an apparatus for determining the profile of a product that is to undergo a subsequent physical process. The subsequent physical process is one in which the product profile is needed to insure proper processing of the product.

BACKGROUND OF THE INVENTION

In one embodiment disclosed herein, the specific subsequent physical process includes slicing the product into individual slices on a slicing machine. Such slicing machines are principally, but not exclusively, used for slicing food products such as cheese, meat and pressed or molded meat products.

Food articles can be sliced on high speed slicing machines such as disclosed in U.S. Pat. Nos. 5,628,237 or 5,974,925 or as commercially available as the FX180® slicer available from Formax, Inc. of Mokena, Ill., USA. Food articles can also be sliced on high speed slicing machines such as disclosed in U.S. patent application Ser. No. 12/255,623, or as commercially available as the PowerMax4000™ slicing system available from Formax, Inc. U.S. Pat. Nos. 5,628,237 or 5,974,925 and U.S. Published Application US2009/0151527 are each hereby incorporated by reference except where inconsistent with the present disclosure.

Typically such slicing machines include a rotating blade and a product feeder that drives the product forward towards the blade so that successive slices are cut from one face of the product. The distance through which the product is advanced between successive cuts of the blade determines the thickness of the slices. Where the product is of uniform shape and density, it may be sufficient to use a single predetermined slice thickness to give a slice or group of slices of the required weight. Further, it may be sufficient to provide an output scale proximate the output side of the blade to measure the current weight of the slice to product and adjust the thickness of the subsequent slice(s) to make the desired unit weight.

In general, however, variations in the shape and density of the product mean that the weight of a slice of a given thickness varies. A previous approach to dealing with this variation is described in U.S. Pat. No. 4,428,263, which is hereby incorporated by reference. That patent describes a process in which an automatic slicing machine is programmed to vary the thickness of the slices in accordance with a typical weight distribution for the product.

It has also been proposed to make some determination of the cross-sectional area of the product as it is cut. One such system is purportedly disclosed in U.S. Pat. No. 5,136,906, titled "Slicing Machine", and assigned to Thurne Engineering Co., Ltd. According to that patent, a slicing machine for cutting slices from a product includes a camera arranged to view a cut face of the product, boundary recognition apparatus arranged to process image signals from the camera to determine a boundary of the cut face, calculating apparatus arranged to calculate a parameter characteristic of the cut face from image data corresponding to regions of the cut face within the boundary, and control signal generating apparatus arranged to generate a control signal to control the operation of the slicer in accordance with the determined parameter.

Although the foregoing system may be suitable for low-throughput slicing machines, it is significantly less suitable for high-speed slicing machines, such as those available from Formax, Inc., of Mokena, Ill., under the brand names FX-180® or PowerMax4000™. First, by calculating the product profile at the cut face, a very limited amount of processing time is available to perform the calculations that are necessary to ensure the proper thickness of each slice before the cut face must again be imaged for processing the thickness of the next slice. Second, substantial measurement inaccuracies may result from shadowing effects resulting from the relative positions of the illumination source, cut face, and slicing machine components—a problem not addressed in the '906 patent. Third, further measurement inaccuracies are introduced by the apparent assumption that the profiles at the bottom and a side of the product are linear. Finally, by attempting to measure the product profile at the cut face, substantial inaccuracies may be introduced due to the presence of scrap product. One of the goals of the apparatus described in the '906 patent is to remove the inaccuracies introduced by the scrap product. However, by addressing this problem at the cut face, the apparatus of the '906 must necessarily introduce a further level and higher degree of image processing.

FIG. 1 illustrates a prior art product processing system described more completely in U.S. Pat. No. 7,450,247, herein incorporated by reference. The system is shown generally at 10, and performs a physical process on a product in which the physical process is dependent on accurate measurement of the profile of the raw product, such as a slab or carcass of meat. As shown, product processing system 10 is comprised of a product profiling apparatus 15 and a product processor 20. The product profiling apparatus 15 functions to measure the profile of the raw product and provide the profile information to the product processor 20 that, in turn, uses the information to accurately execute the physical process that is to be performed on the raw product.

In the embodiment illustrated in FIG. 1, the acquisition of the product profile information is completed before the particular raw product undergoes physical processing in the product processor 20. Using the configuration shown in FIG. 1 in which the profiling apparatus 15 is disposed prior to the product processor 20, it is possible to acquire complete product profiles for several individual raw products before each of the raw products is provided to the input of the product processor 20. Additionally, if the profiling apparatus 15 is designed as a stand-alone apparatus, then the profiling apparatus 15 may be used to provide product profile information to a plurality of different product processors that are operating in either a time sequential or concurrent manner.

Generally stated, the profiling apparatus 15 is comprised of an input section 25, a scanning section 30, and an output section 35. The input section 25 includes a conveying surface 40 disposed to support the product 45 that is to be profiled.

Scanning section 30 includes a housing 55 having an input end that is open to receive product 45 and an outlet end that is open to allow product 45 to exit therefrom. In the illustrated embodiment, housing 55 comprises a principal housing portion 60, an upper vision system housing 65, and a lower vision housing 70. The upper vision system housing 65 includes an upper vision system disposed therein. The upper vision system of the disclosed embodiment includes a vertically directed line laser 75 for illuminating one side of the product in a fixed plane traversed by the driven product and an associated camera 80 vertically angled for imaging the laser-illuminated contour of the product 45. Similarly, the lower vision system housing 70 includes a lower vision system disposed therein that is comprised of a line laser 85 and corresponding camera 90 for addressing the other side of the product. Each of the upper and lower vision system housings 65 and 70 includes an opening that is positioned to allow the respective vision system to view a product 45 passing through the principal housing 60. These openings may merely comprise cut out sections. Preferably, however, the openings are covered with a transparent material to form a window that mechanically isolates the vision system components from the components disposed in the principal housing 60 yet does not interfere with the vision system operation. While the prior art system of FIG. 1 is capable of obtaining a product profile, there exists a need for a product profiling system that obtains profile information with more precision.

The present inventors have addressed many of the foregoing problems inherent in the product profiling operations of prior art. To this end, they have developed an accurate and cost-effective product profiling apparatus that is suitable for use, for example, in connection with high-speed product slicing machines.

Numerous other advantages and features of the present invention will be become readily apparent from the following detailed description of the invention and the embodiments thereof, from the claims and from the accompanying drawings.

SUMMARY OF THE INVENTION

An apparatus for acquiring a profile of a product for use in subsequent processing of the product is set forth. The apparatus includes a scanning chamber for accepting the product and one or more product drives that are operable to drive the product through the scanning chamber prior to delivery of the product to a subsequent product processor. The apparatus also includes a vision system disposed to acquire visual information relating to the profile of the product prior to delivery of the product to a subsequent product processor and a control system connected for control of the vision system and operating to convert the information received from the vision system into a format suitable for use by a subsequent product processor.

BRIEF DESCRIPTION OF THE DRAWINGS

FIG. 14 is a perspective view of the weight scale with the conveying surface removed for clarity.

DETAILED DESCRIPTION OF THE PREFERRED EMBODIMENTS

Figure 1:
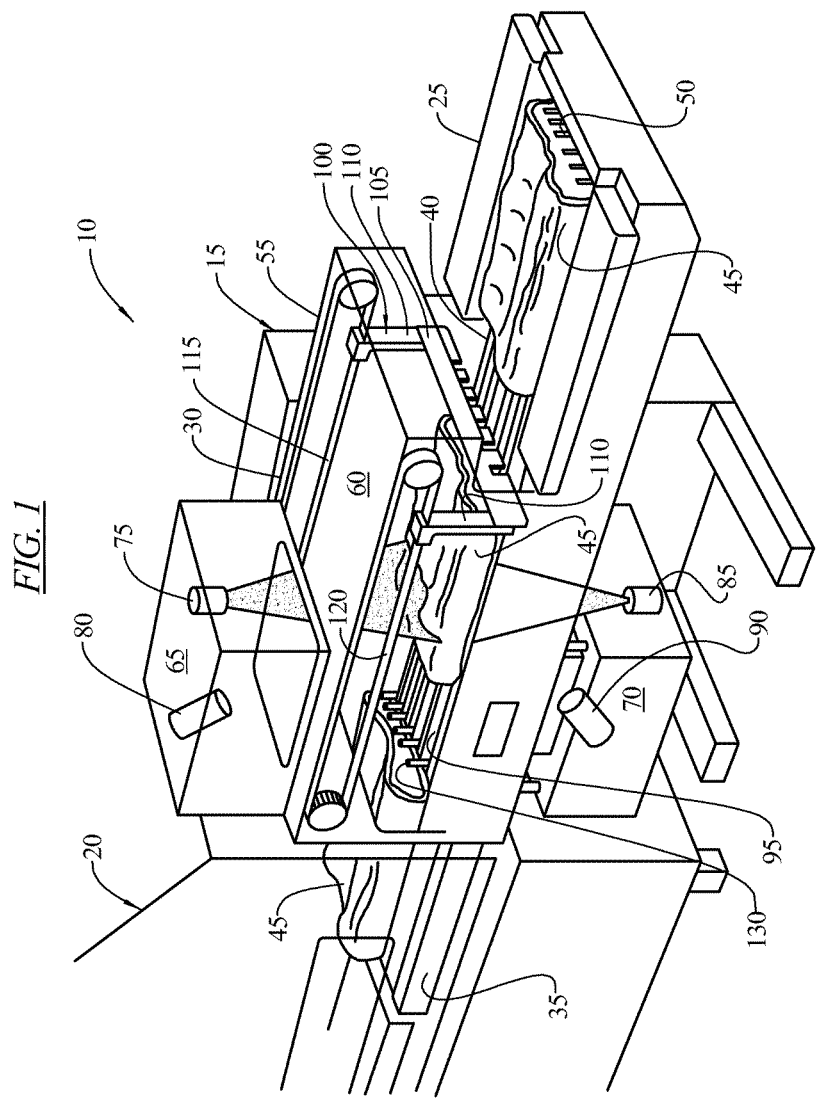
FIG. 1 is a perspective view of a prior art product processing system.

While this invention is susceptible of embodiment in many different forms, there are shown in the drawings, and will be described herein in detail, specific embodiments thereof with the understanding that the present disclosure is to be considered as an exemplification of the principles of the invention and is not intended to limit the invention to the specific embodiments illustrated.

The disclosed embodiments of the present invention are improvements to the prior art referenced in FIG. 1 and the prior art disclosed in U.S. Pat. No. 7,450,247, herein incorporated by reference except where inconsistent with the present disclosure. Prior art, as shown in FIG. 1, uses a single laser line in each of the upper and lower vision system housings 65 and 70. U.S. Pat. No. 7,450,247 discloses the use of two opposing line lasers for illuminating downwardly and across the product from opposed sides of the product in each of the upper and lower vision system housings 65 and 70.

It is considered more preferable, as further discussed below, that the upper vision system housing 265 (FIG. 3) contain two opposing line lasers for illuminating downwardly and across the product from opposed sides of the product, and a top line laser illuminating downwardly in a plane perpendicular to the plane generated by the two opposing line lasers; and a side vision housing 266, illustrated in FIG. 3, containing a side line laser 902 (FIG. 4) for illuminating a side of the product in a plane perpendicular to the plane generated by the top line laser.

Figure 3:
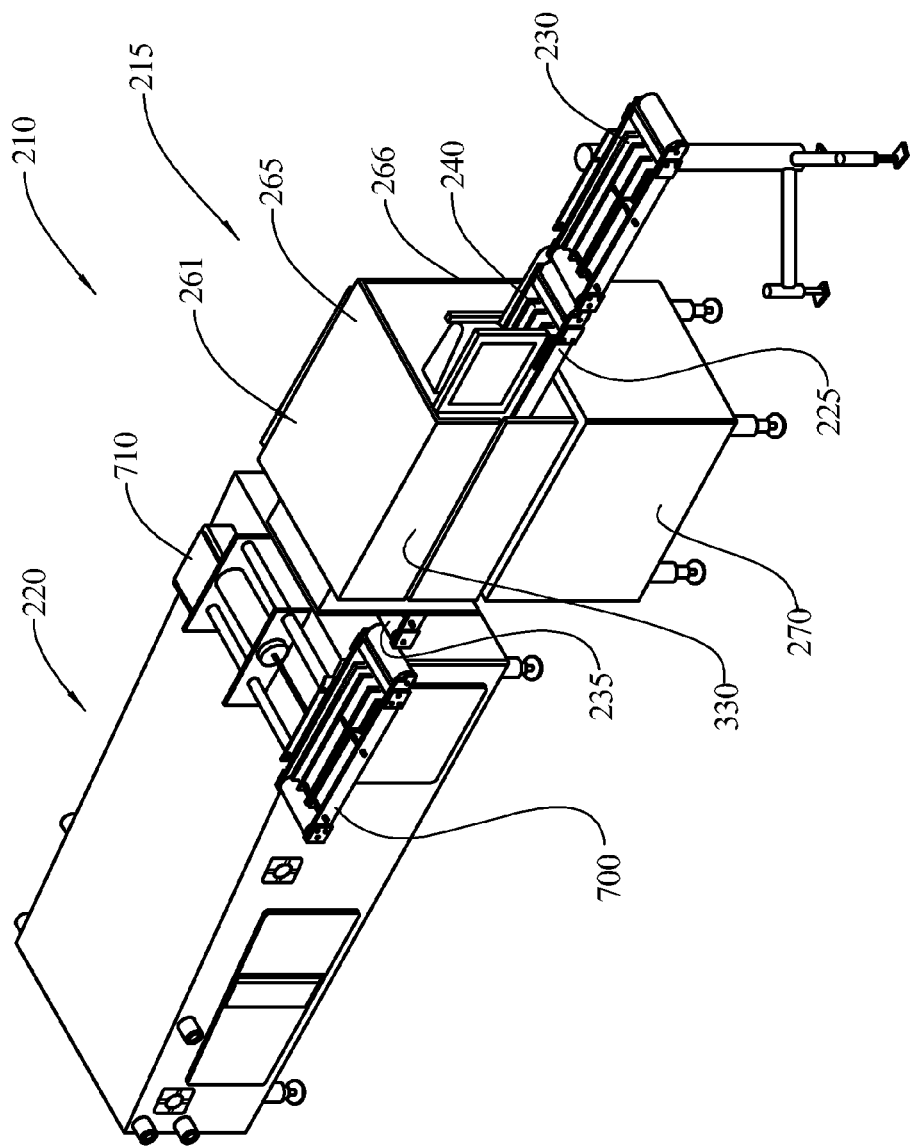
FIG. 3 is a perspective view of a product processing system constructed in accordance with one embodiment of the present invention.

The principal housing 261, illustrated in FIG. 3, comprises upper housing 265, side housing 266, and lower housing 270. Product (not shown) is moved along the production line by product drives providing a conveying surface 240 such as a conveyor belt. Conveying surfaces are preferably driven by drive belts (not shown) at a constant, precise velocity by, for example, a servo motor or a motor with a resolver. At the output section 235, the product (not shown) is engaged by a staging belt 700 which conveys the product to a subsequent product processor 220, such as a slicing machine. The slicing machine can be a high speed slicing machine such as a Formax FX-180® or PowerMax4000™ machine or as described in U.S. Published Application US2009/0151527, herein incorporated by reference.

Figure 2:
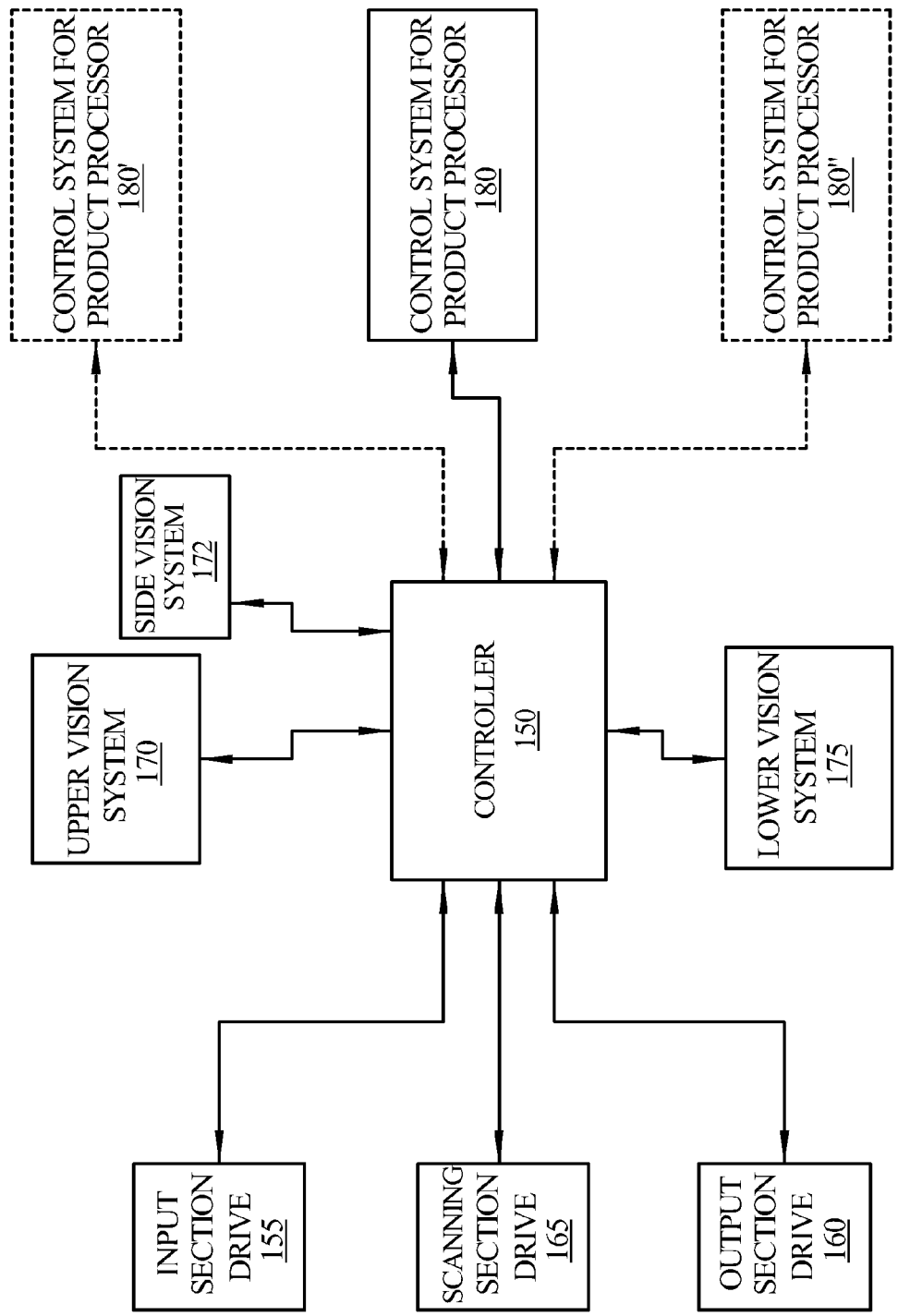
FIG. 2 is a schematic block diagram of one embodiment of a control system that may be used in the profiling apparatus of the present invention.

FIG. 2 is a schematic block diagram of one embodiment of a control system suitable for controlled operation of product profiling apparatus of the present invention. In the illustrated embodiment, the control system comprises a controller 150 that can be responsible for some or all of the functions 1) controlling the drive mechanisms associated with various portions of the profiling apparatus 15; 2) coordinating the operation of the vision systems, including acquisition of the profile data; and 3) communicating the profile data to control systems for one or more product processors 20. To this end, the controller 150 is connected to receive sensed signals from and provide motion control signals to each of the input and output section drives 155 and 160 and the scanning section drive 165. Similarly, the central controller 150 is connected to receive sensed signals from and provide scanning control signals to the upper, lower and side vision systems 170, 175 and 172.

Ultimately, the profile information acquired from the upper, lower, and side vision systems 170, 175 and 172 is communicated to the control system 180 of at least one product processor 220. Profile information may be communicated to the control system 180 in any one of a variety of processing states. For example, the controller 150 may communicate raw profile data to the control system 180. Alternatively, or in addition, the controller 150 may communicate the profile information after the raw data it acquires has been processed at the controller 150 thereby relieving the control system 180 from much of the additional processing overhead associated with profile calculations. The controller 150 can be located in whole or in part with the control system 180.

If more than one product processor 220 is to be served by a single product profiling apparatus 215, then a method for tracking each product 45 (FIG. 1) through the system to insure that each of the product processors 220 receives the correct profile data should be provided. For example, each of the products 45 may be provided with a bar-code or other visual image marker that may be acquired or otherwise input to the central controller 150 as well as the particular control system 180, 180', 180" associated with the particular product processor 220 that is to slice the particular product. When the identity of the product 45 that is to be sliced by the product processor is determined by the respective control system 180, 180', 180", the particular control system may request the profile data associated with the identified product from the central controller 150.

Figure 4:
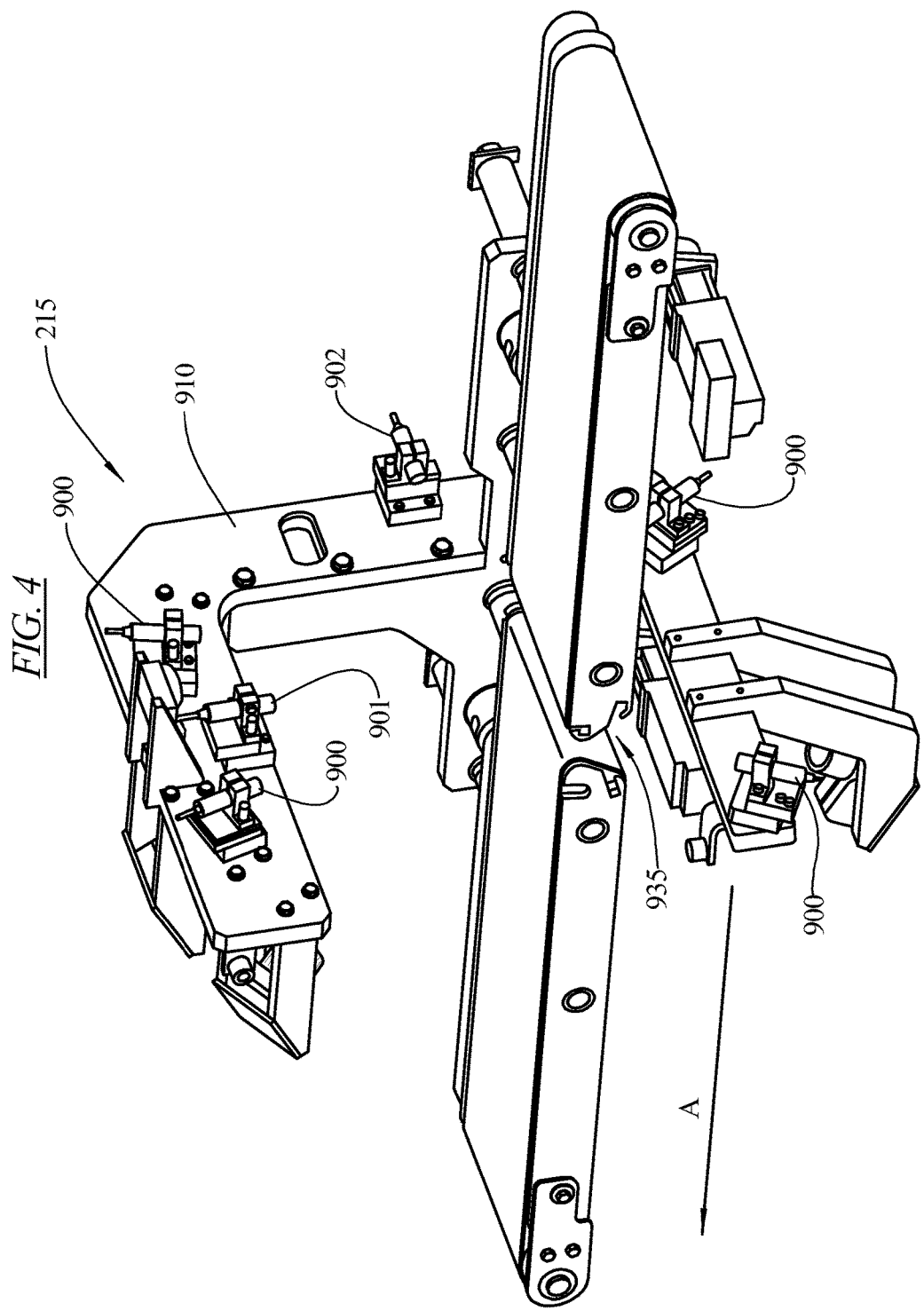
FIG. 4 is a perspective view of the product profiling apparatus with housings removed for clarity.
Figure 7:
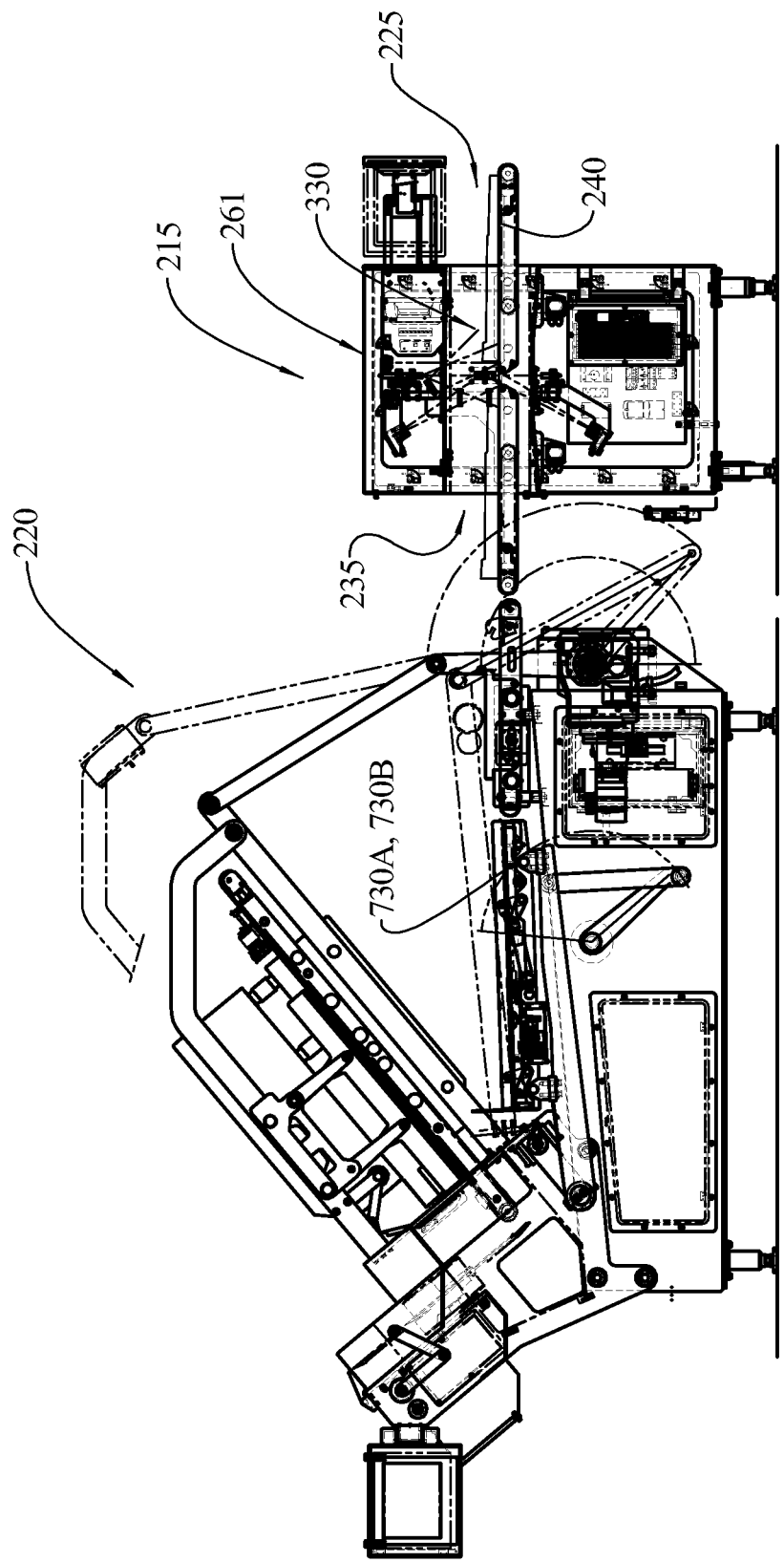
FIG. 7 is a side view of a product processing system constructed in accordance with one embodiment of the present invention.
Figure 9:
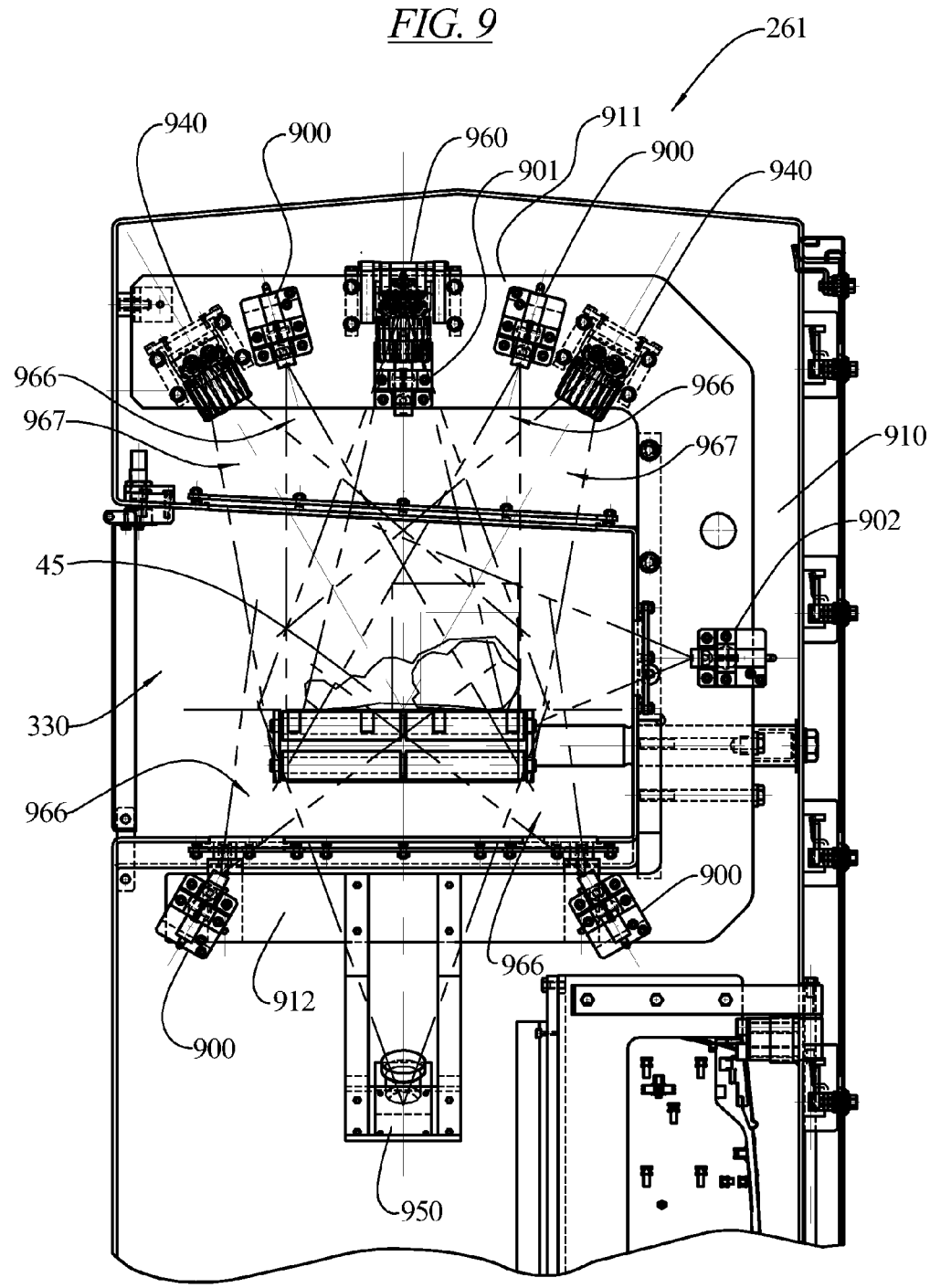
FIG. 9 is a cross sectional view of the scanning section.

In operation, the profiling apparatus 215 is as illustrated in FIGS. 3 and 7. First, the product (FIG. 3) is provided at input section 225 where it is supported by a conveying surface 240. The controller 150 (FIG. 2) then activates input section drive 155 to move the product into the scanning section 330 (FIGS. 3 and 7). Top and bottom pairs of opposing line lasers 900 (FIGS. 4 and 9) are mounted on a support frame 910, which is enclosed in a housing (not shown). Pairs of opposing line lasers 900 are arranged angled towards each other, as illustrated in FIGS. 4 and 9, such that their beams 966 (FIG. 9) overlap on at least a portion of the product 45. The opposing line lasers provide for higher resolution camera imaging, as discussed in U.S. Pat. No. 7,450,247. A top line laser 901 is also mounted to the support frame 910. The top line laser illuminates downward along the length of the product, generating a top laser line 920 (FIG. 5) parallel to the direction of travel "A."

Figure 5:
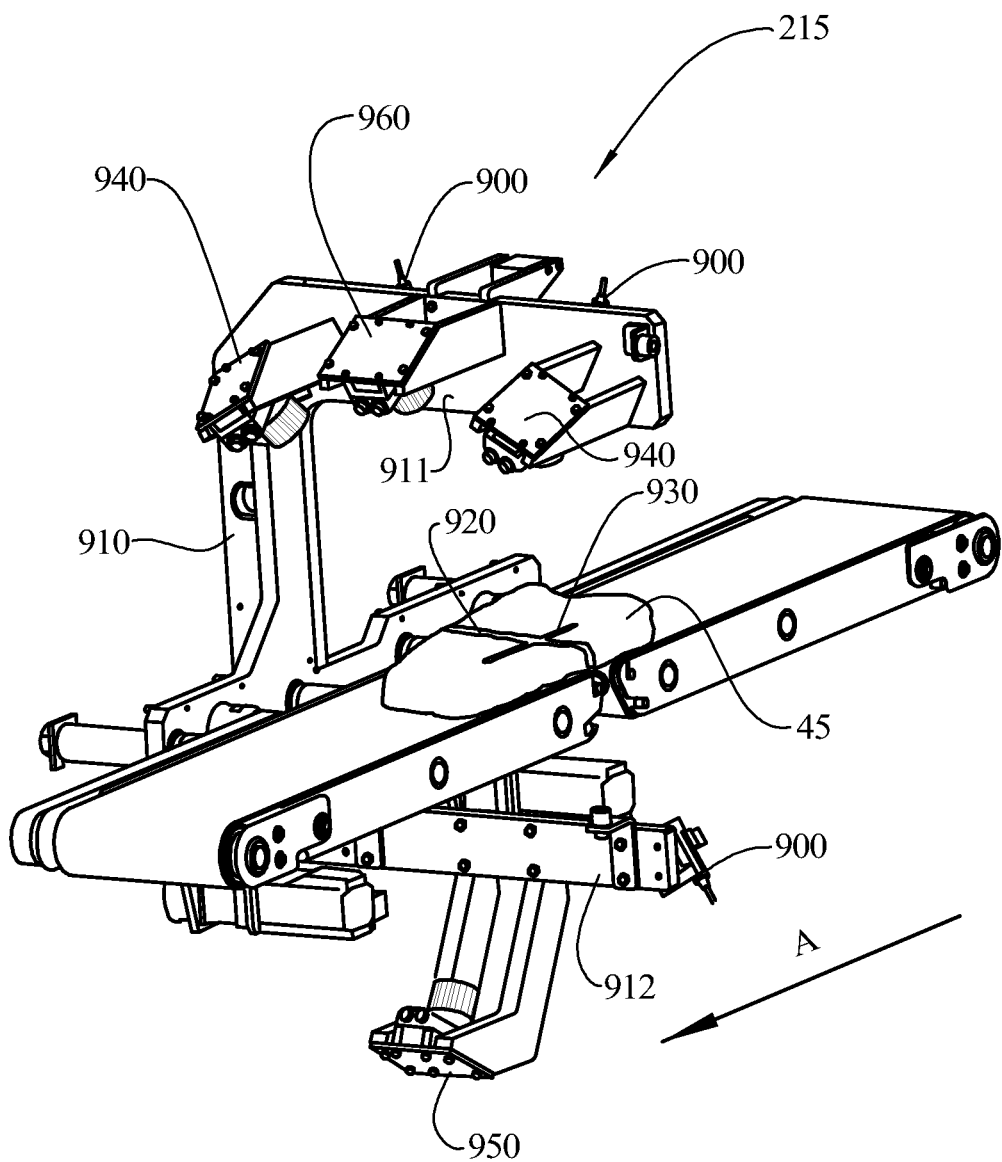
FIG. 5 is a perspective view of the product profiling apparatus with housings removed for clarity.

Two angled cameras 940 (FIGS. 5 and 9) are positioned on the top portion 911 of the support frame 910 on the side opposite line lasers 900, 901 (FIGS. 4 and 9). The angled cameras 940 are arranged as illustrated in FIGS. 5 and 9, such that their image area 967 overlaps on a least a portion of the product 45. A bottom camera 950 (FIGS. 5 and 9) is attached to a bottom portion 912 of the support frame 910. The bottom of the profiling apparatus comprises two opposing line lasers 900 mounted on the support frame 910, and a camera 950 attached to the support frame 910 to capture images from the bottom.

In accordance with one embodiment of the profiling apparatus 215, a resolver or the like associated with the scanning section drive 165 (FIG. 2) generates control pulses corresponding to incremental movement of the product over a fixed distance through the principal housing 261 (FIGS. 3 and 7). These control pulses are used as synchronization signals that the controller 150 uses to trigger the acquisition of a profile reading. Here, the profile readings are in the form of a visual image captured by the cameras 940, 950, and optionally 960 (FIGS. 5 and 9), at fixed increments along the length of the product 45. The product profile is accentuated by directing a line of laser light from the line lasers 900 across the upper and lower surfaces of the product, and along the longitudinal length of the upper surface. FIG. 5 illustrates the laser light across the width 920 and along the longitudinal length 930 of the upper surface of a food product 45. Accordingly, the interior of the principal housing 261 is advantageously dark so that cameras 940, 950 and optionally 960 may detect the line projected by line lasers 900, 901, 902.

The angled arrangement of the cameras 940 (FIGS. 5 and 9) allows improved profile analysis of the product. The two angled cameras 940 each work in conjunction with the top laser to acquire images along the side surfaces of the product. Images captured on the angled cameras 940 are used to generate images from the top, left and right surfaces of the slab, with the dividing line between the left and right surfaces being the top laser line, which is often generally, but not necessarily, along the center of the product due to the often irregular shape of food products. Profile analysis using captured images from the two angled cameras 940 uses the top laser line 920 as a reference for generating information about the contour of the product. When a portion of the product is analyzed from each side, the top laser line 920 indicates a point where analysis from either side can be merged without overlapping the profiling information calculated for each side. Thus, an exact centerline need not necessarily be used.

An optional top camera 960 can be provided to gather additional images. However, the use of a top camera 960 is not required to operate the system 210. Two angled cameras can be arranged on the bottom, in a similar fashion to the top angled cameras 940. However, because the bottom portion of the product is generally more flat than the top surface, the bottom surface profile is usually adequately imaged using the arrangement show in FIGS. 4, 5 and 9. The bottom camera 950 is able to capture images generated by the pair of bottom opposing line lasers 900 because a small open junction 935 in the conveying surface, as a result of situating two conveying surfaces adjacent to each other (FIGS. 4 and 8), allows for the opposing lines generated by the opposing line lasers, and the camera, to reach a portion of the bottom of product exposed between the junction 935.

Figure 8:
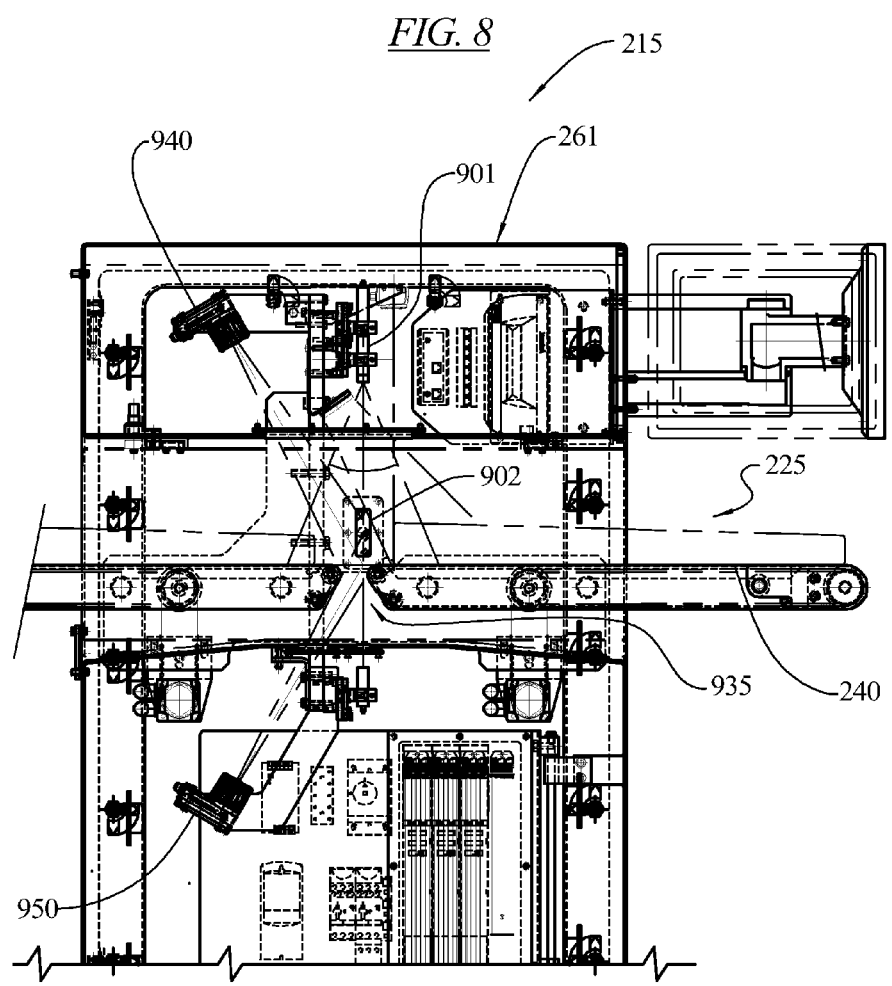
FIG. 8 is a side view of the product profiling apparatus.

The profiling apparatus 215 in FIGS. 4, 8 and 9 further comprise a side laser 902. The side laser 902 is mounted to the support 910, and assists in providing additional illumination to areas that may be shadowed as a result of product shape irregularities. A second side laser can be provided opposite of and positioned across the conveying surface from the side laser 902, however, having only one side laser is often sufficient to provide illumination of the product, particularly in cases where one side of the product has a higher contour than another.

Figure 11:
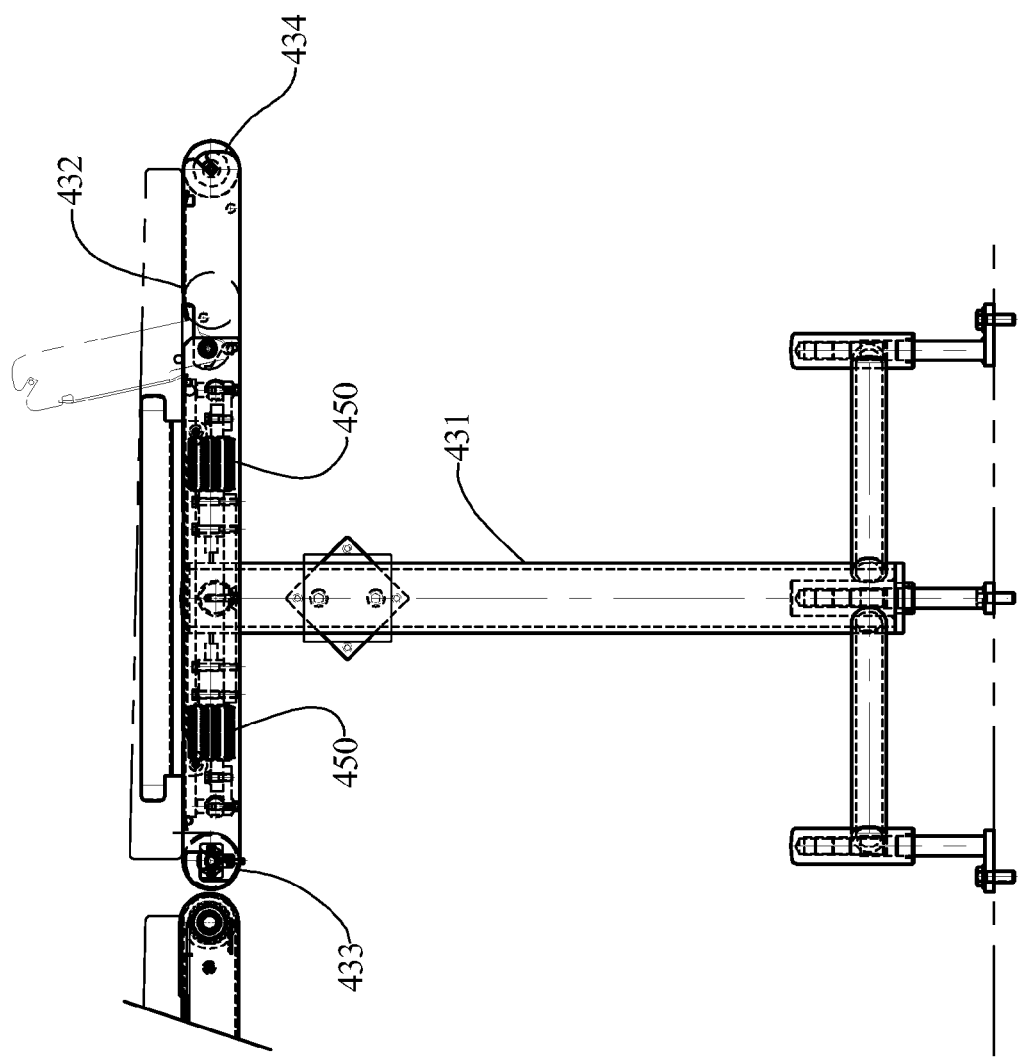
FIG. 11 is a side view of the weigh scale.
Figure 12:
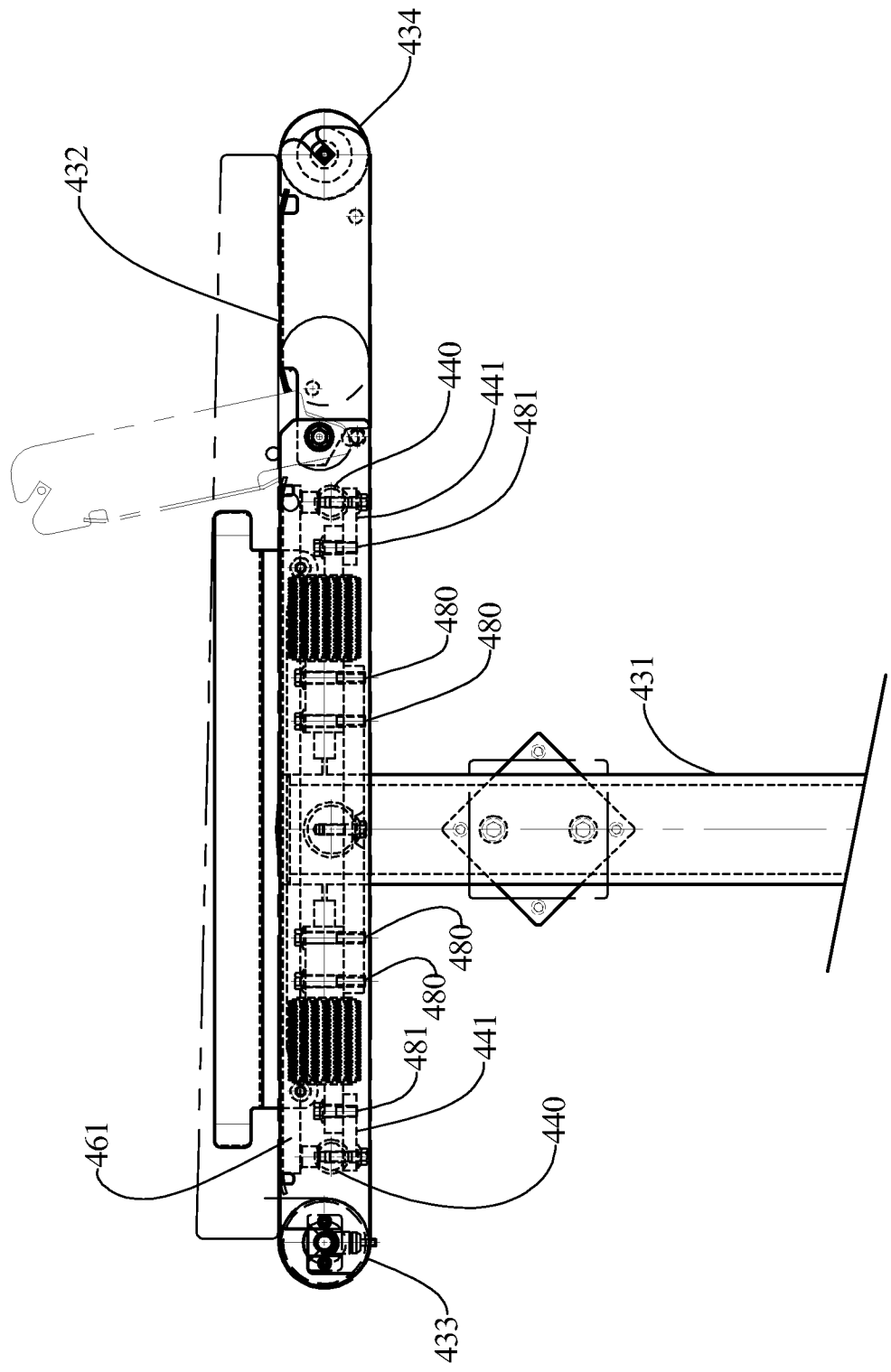
FIG. 12 is a side view of the weigh scale.
Figure 13:
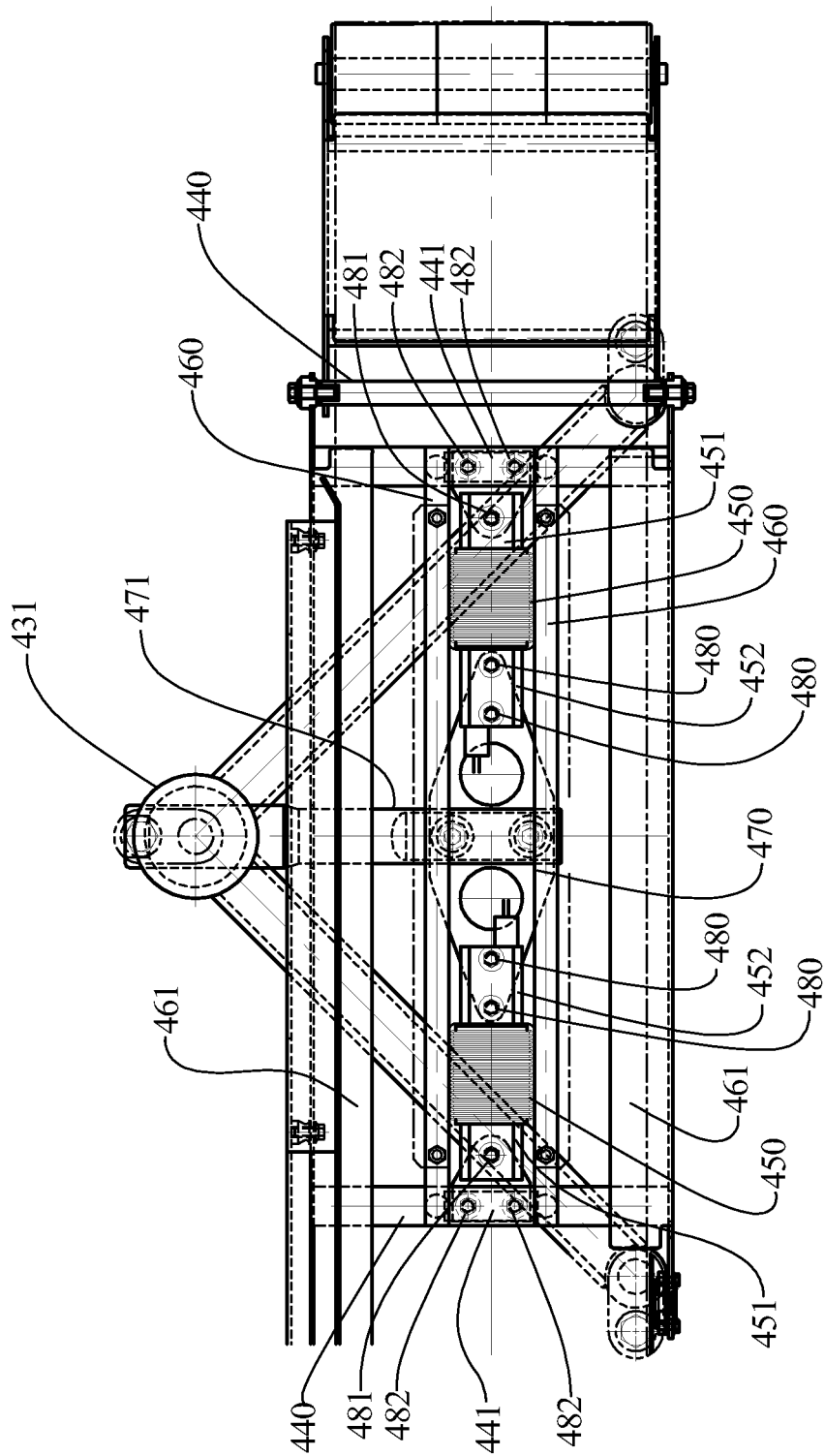
FIG. 13 is a top view of the weigh scale.

The product processing system 210, as illustrated in FIG. 3, may include a weigh scale 230 (FIGS. 11-14) for weighing the product. This weigh scale can be situated at the beginning of the processing line, in advance of the profiling apparatus, within the profiling apparatus, or after the profiling apparatus. The stand alone nature of the weigh scale 230 mounted on a pedestal 431 as seen in FIG. 11, allows the scale to be easily moved into various positions along the processing stream. The weigh scale 230 comprises a conveying surface 432, such as a conveyer belt, which is driven by a drum motor 433 on one end, and an idle roller 434 on the opposite end. The conveying surface is supported by support frames 461, and inner support rods 460 (FIGS. 13 and 14). Each end of the support frames 461 and inner support rods 460 are connected to a horizontal bar 440 (FIGS. 12-14). Two load cells 450, such as the BEAM LOAD CELL BBL sold by Eilerson Industrial Sensors, are disposed between the inner support rods 460. The load cells 450 comprise an inner end 452 and an outer end 451. The outer ends 451 of the load cell 450 are attached to a triangular plate 441, which are connected to the horizontal bars 440. The inner ends 452 of the load cell are attached to a diamond shaped frame 470 (FIGS. 13 and 14) mounted to a central bar 471 of the pedestal 431. Load cells 450 are connected to the triangular plate 441 and the diamond shaped frame 470 through the use of screws 481, 480 respectively. Horizontal bars 440 are connected to the triangular plate 441 through the use of screws 482.

The output of the scale may be signal connected to controller 150 or the control system 180. Controller 150 may be programmed to calculate the overall volume of a product based on the profile measurements. Controller 150 may then use the overall product value and the weight provided by the digital scale to calculate the average density of a product. The average density measurement may be used by the product processor 220, which can be a slicing machine, in combination with the profile measurements to calculate the product slice thicknesses that are required to make a particular weight, such as the weight of product slices that are to be provided in a single consumer package. Alternatively, one or more of the average density, overall volume, or product profile measurements/calculations may be executed by the control system 180 of the slicing machine. The slicing machine can be, for example, the slicing machine disclosed in U.S. Published Patent Application US2009/0151527.

Figure 6:
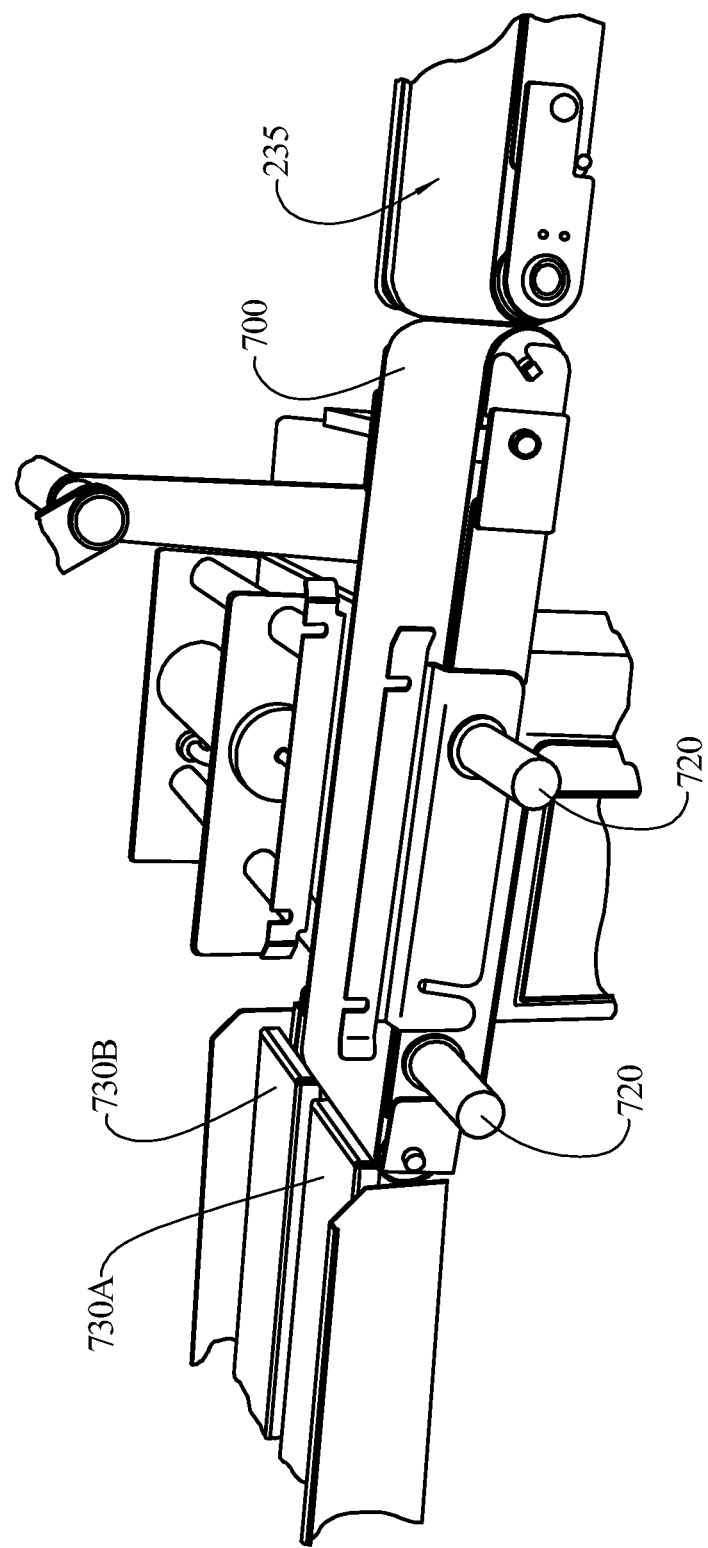
FIG. 6 is a perspective view of the processing line downstream of the profiling apparatus.
Figure 10:
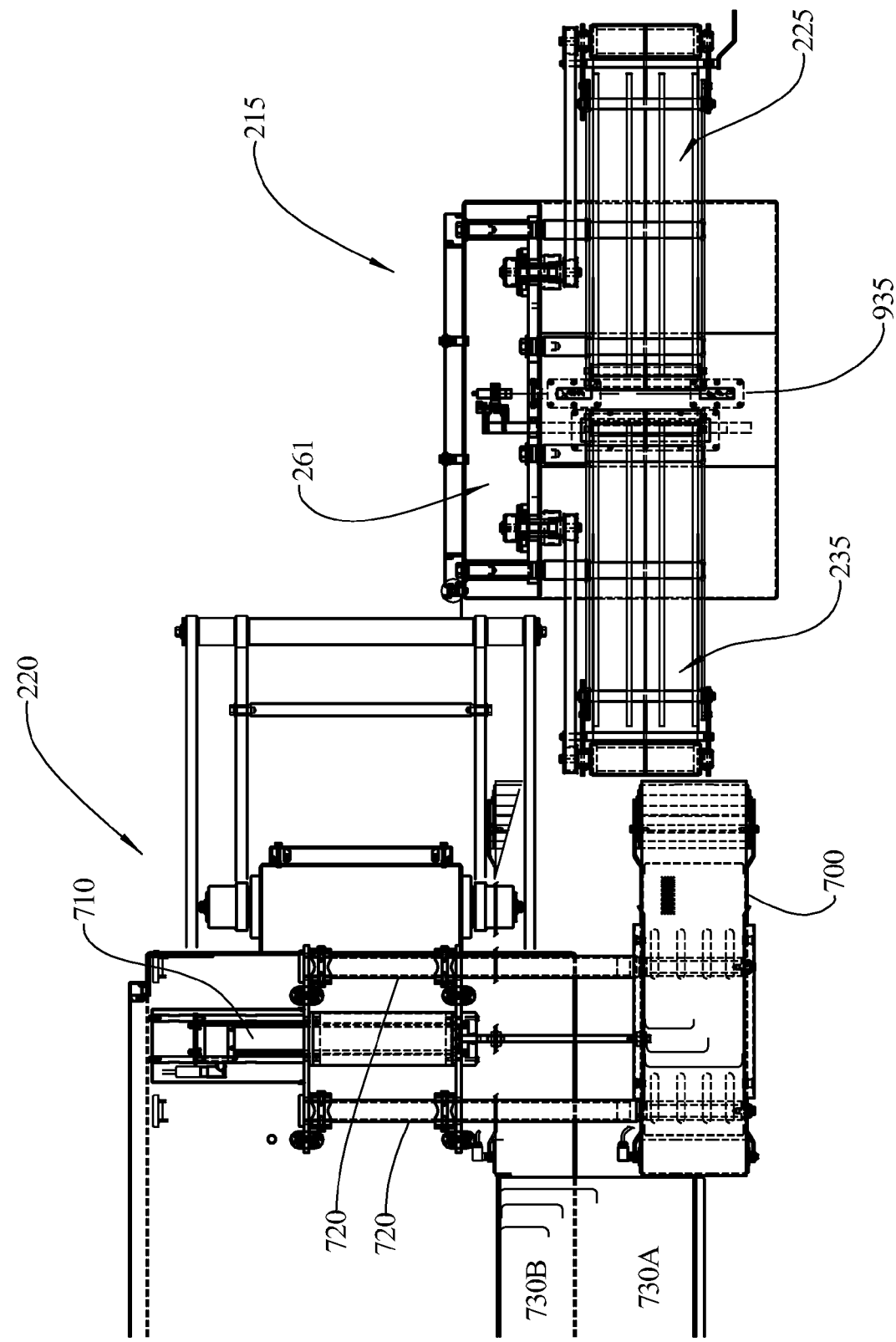
FIG. 10 is a top view of the processing line downstream of the profiling apparatus.

Once a product profile has been analyzed, the product is moved to a staging belt 700 (FIGS. 3, 6 and 10) which transfers the product to staging positions 730A, 730B (FIG. 6). Product is transferred by the staging belt 700 to either of two staging positions 730A, 730B through lateral movement of the staging belt 700 along support rods 720 (FIGS. 6 and 10). The staging positions 730A, 730B correspond to product lift trays of the slicing apparatus which, once loaded with product, tilt up and load the products onto the slicing plane. Details of this lift tray can be found in U.S. Published Patent Application US2009/0151527.

The lateral movement of the staging belt 700 can be driven by a linear actuator such as a servo motor screw drive 710 as illustrated in FIGS. 3 and 10. The controller 150 or the control system 180 or both can communicate sufficiently such that the surface profile and/or the volume and/or the density of the product loaded into position 730A is known by the product processor 220 and is tracked all the way to the slicing operation. The controller 150 or the control system 180 or both can communicate sufficiently such that the surface profile and/or the volume and/or the density of the product loaded into position 730B is known by the product processor 220 and is tracked all the way to the slicing operation.

From the foregoing, it will be observed that numerous variations and modifications may be effected without departing from the spirit and scope of the invention. It is to be understood that no limitation with respect to the specific apparatus illustrated herein is intended or should be inferred.

All references, including publications, patent applications, and patents, cited herein are hereby incorporated by reference to the same extent as if each reference were individually and specifically indicated to be incorporated by reference and were set forth in its entirety herein, except where inconsistent with the present disclosure.

The invention claimed is:

1. An apparatus for acquiring a profile of a food product for use in subsequent processing of the food product, comprising:
   a scanning area;
   at least one product drive configured to drive a food product through the scanning area in a longitudinal direction;
   a first vision system configured to scan a first surface of the food product in the scanning area, the first vision system having
      at least one illumination device, the at least one illumination device projecting light transversely to the longitudinal direction on the first surface,
      two first image capturing devices arranged to capture different first transverse image portions of the first surface illuminated by the light of the illumination device, wherein the two first image capturing devices are configured to capture overlapping images, and
      a reference illumination device configured to project reference light on the first surface that indicates a transverse reference position,
      wherein the two first image capturing devices are configured to capture the reference position along with the different first transverse image portions; and
   a control system configured to process the different first transverse image portions, the control system is configured to use the transverse reference position to combine the different first transverse image portions captured by the two first image capturing devices to eliminate overlap in the different first transverse image portions, and wherein the control system is configured to calculate a first profile of the first surface at multiple positions along a length of the first surface as the food product is driven through the scanning area.

2. The apparatus of claim 1, wherein the at least one first illumination device comprises a pair of first illumination devices configured to project overlapping light onto the first surface to create the light transversely projected onto the first surface.

3. The apparatus of claim 2, wherein the at least one first illumination device comprises at least one side illumination device configured to project light onto a side of the food product that overlaps with the first transversely projected light on the first surface.

4. The apparatus of claim 1, wherein the first vision system further comprises at least one side illumination device configured to project light onto a side of the food product that overlaps with the first transversely projected light on the first surface.

5. The apparatus of claim 1, further comprising a second vision system configured to scan a second surface of the food product in the scanning area opposite the first surface, the second vision system having
  at least one second illumination device, wherein the second illumination device is configured to project light transversely to the longitudinal direction on the second surface, and
  at least one second image capturing device arranged to capture a second transverse image portion of the second surface illuminated by the light projected by the at least one second illumination device; and
  wherein the control system is configured to calculate a second profile of the second surface using the second transverse image portion at multiple positions along a length of the second surface as the food product is driven through the scanning area and calculates an area between the first and second profiles at said multiple positions.

6. The apparatus of claim 5, wherein the first surface is an upper surface and the two image capturing devices are angled down and inward toward the reference position from opposite transverse sides of the first surface.

7. The apparatus of claim 5, further comprising a third image capturing device arranged between the two image capturing devices.

8. The apparatus of claim 7, wherein all the image capturing devices are cameras.

9. The apparatus according to claim 1, wherein the reference illumination device projects the reference light in a longitudinal direction on the food product and an intersection between the reference light and the first transversely projected light constitutes the transverse reference position.

10. The apparatus of claim 1, further comprising a second vision system configured to scan a second surface of the food product in the scanning area opposite the first surface, the second vision system having
  at least one second illumination device, wherein the at least one second illumination device is configured to project light transversely to the longitudinal direction on the second surface, and
  at least one second image capturing device arranged to capture a second transverse image portion of the second surface illuminated by the light projected from the at least one second illumination device; and
  wherein the at least one first illumination device comprises a pair of first illumination devices configured to project overlapping light onto the first surface creating the light transversely projected onto the first surface;
  wherein the at least one second illumination device comprises a pair of second illumination devices configured to project overlapping light onto the second surface creating the light transversely projected onto the second surface; and
  wherein the control system is configured to calculate a second profile of the second surface using the second transverse image portion at multiple positions along a length of the second surface as the food product is driven through the scanning area, and wherein the control system is configured to calculate an area between the first and second profiles at said multiple positions.

11. The apparatus of claim 10, wherein the first surface is a top surface and the second surface is a bottom surface and wherein the first vision system further comprises at least one side illumination device configured to project light onto a side of the food product that overlaps with the light transversely projected onto the first surface.

12. The apparatus of claim 11, wherein the reference illumination device projects the reference light in a longitudinal direction on the food product and an intersection between the reference light and the first transversely projected light constitutes the transverse reference position.

13. The apparatus of claim 12, wherein the control system is configured to calculate a volume of the food product.

14. The apparatus of claim 1, wherein the control system is configured to calculate a volume of the food product.

15. The apparatus of claim 14, further comprising a weigh scale configured to calculate weight of the food product and a slicing machine configured to slice the food product at locations based on the volume and the weight of the food product.

16. The apparatus of claim 1, wherein the first illumination device is a first line laser and wherein the light projected by the first illumination device is a laser line.

17. The apparatus of claim 1, wherein the two first image capturing devices are two first cameras.

18. The apparatus of claim 1, wherein the reference illumination device is a reference laser and wherein the reference light projected by the reference laser is a reference laser beam.

19. An apparatus for acquiring a profile of a food product for use in subsequent processing of the food product, comprising:
  a scanning area;
  at least one product drive configured to drive a food product through the scanning area in a longitudinal direction;
  a first vision system configured to scan a first surface of the food product in the scanning area, the first vision system having
    at least one illumination device, wherein the at least one illumination device is configured to project light transversely to the longitudinal direction on the first surface,
    two image capturing devices arranged to capture different first transverse image portions of the first surface illuminated by the light of the at least one illumination device, wherein the two image capturing devices are configured to capture overlapping images; and
  a control system configured to process the different first transverse image portions and combine the different first transverse image portions captured by the two image capturing devices to eliminate overlap in the different first transverse image portions, and wherein the control system is configured to calculate a first profile of the first surface at multiple positions along a length of the first surface as the food product is driven through the scanning area.

20. The apparatus of claim 19, wherein the at least one illumination device comprises a pair of illumination devices configured to project overlapping light onto the first surface creating the light transversely projected onto the first surface.

21. The apparatus of claim 20, wherein the at least one illumination device comprises at least one side illumination device configured to project light onto a side of the food product that overlaps with the first transversely projected light on the first surface.

22. The apparatus of claim 19, wherein the first vision system further comprises at least one side illumination device configured to project light onto a side of the food product that overlaps with the first transversely projected light on the first surface.

23. The apparatus of claim 19, further comprising a second vision system configured to scan a second surface of the food product in the scanning area opposite the first surface, the second vision system having at least one second illumination device, wherein the at least one second illumination device is configured to project light transversely to the longitudinal direction on the second surface, and at least one second image capturing device arranged to capture a second transverse image portion of the second surface illuminated by the light projected by the at least one second illumination device; and wherein the control system is configured to calculate a second profile of the second surface using the second transverse image portion at multiple positions along a length of the second surface as the food product is driven through the scanning area, and wherein the control system is configured to calculate the area between the first and second profiles at said multiple positions.

24. The apparatus of claim 23, wherein the first surface is an upper surface and the two image capturing devices of the first vision system are angled down and inward from opposite transverse sides of the first surface.

25. The apparatus of claim 23, wherein all the image capturing devices are cameras.

26. The apparatus of claim 23, wherein the control system calculates a volume of the food product.

27. The apparatus of claim 19, wherein the control system calculates a volume of the food product.

28. The apparatus of claim 27, further comprising a weigh scale configured to calculate a weight of the food product and a slicing machine configured to slice the food product at locations based on the volume and the weight of the food product.

29. The apparatus of claim 19, wherein the illumination device is a line laser and wherein the light projected by the illumination device is a laser line.

30. The apparatus of claim 19, wherein the two image capturing devices are two cameras.

\* \* \* \* \*